United States Patent
Garcia et al.

(10) Patent No.: US 8,195,372 B2
(45) Date of Patent: Jun. 5, 2012

(54) METHOD OF ADAPTIVE BRAKING CONTROL FOR A VEHICLE

(75) Inventors: Jean-Pierre Garcia, Colomiers (FR); David Frank, Paris (FR); Gérard Léon Gissinger, Balschwiller (FR); Michel Basset, Heimsbrunn (FR); Yann Chamaillard, Le Bardon (FR); Arnaud Jacquet, Clamart (FR)

(73) Assignee: Messier-Bugatti-Dowty, Velizy Villacoublay (FR)

(*) Notice: Subject to any disclaimer, the term of this patent is extended or adjusted under 35 U.S.C. 154(b) by 1174 days.

(21) Appl. No.: 11/958,610

(22) Filed: Dec. 18, 2007

(65) Prior Publication Data

US 2008/0154471 A1 Jun. 26, 2008

(30) Foreign Application Priority Data

Dec. 21, 2006 (FR) ...................................... 06 11227

(51) Int. Cl.
*G05D 1/00* (2006.01)

(52) U.S. Cl. ................ 701/75; 701/59; 701/60; 701/70; 701/74; 700/29; 700/30; 700/31; 700/32; 188/137; 73/121; 303/121

(58) Field of Classification Search ..................... 701/70, 701/71, 74, 75, 59; 73/121; 188/137; 303/121; 700/29, 30, 31, 32
See application file for complete search history.

(56) References Cited

U.S. PATENT DOCUMENTS

| | | | | |
|---|---|---|---|---|
| 3,948,570 A | * | 4/1976 | Fukumori et al. | 303/193 |
| 4,794,538 A | * | 12/1988 | Cao et al. | 701/74 |
| 5,312,170 A | * | 5/1994 | Erban et al. | 303/150 |
| 5,719,565 A | * | 2/1998 | Tsuno et al. | 340/905 |
| 5,941,924 A | * | 8/1999 | Maisch | 701/70 |
| 6,074,021 A | * | 6/2000 | Ishikawa et al. | 303/163 |
| 6,122,585 A | * | 9/2000 | Ono et al. | 701/71 |
| 6,324,461 B1 | * | 11/2001 | Yamaguchi et al. | 701/80 |
| 6,446,490 B1 | * | 9/2002 | Lohner et al. | 73/39 |
| 2008/0154471 A1 | * | 6/2008 | Garcia et al. | 701/75 |

FOREIGN PATENT DOCUMENTS

| | | |
|---|---|---|
| EP | 0 219 023 A2 | 4/1987 |
| EP | 0 630 786 A1 | 12/1994 |
| EP | 1 372 049 A1 | 12/2003 |
| WO | 98/50262 A1 | 11/1998 |

* cited by examiner

*Primary Examiner* — Redhwan K Mawari

(74) *Attorney, Agent, or Firm* — Sughrue Mion, PLLC

(57) ABSTRACT

A braking control method that includes: (1) regularly updating a grip model representative of a relationship between a coefficient of friction and a wheel slip rate; (2) determining, with an iterative calculation process including a plurality of calculation cycles a variation of a braking setpoint in a given prediction horizon, the variation of the braking setpoint in the given prediction horizon being established using the regularly updated grip model and its characteristic shape and so that the variation of the braking setpoint in the given prediction horizon complies with the braking order and complies with a given calculation constraint which is function of the wheel slip rate; and (3) retaining as the generated braking setpoint a value of the braking setpoint in the given prediction horizon which corresponds to a first calculation cycle of the plurality of calculation cycles of the iterative calculation process.

6 Claims, 2 Drawing Sheets

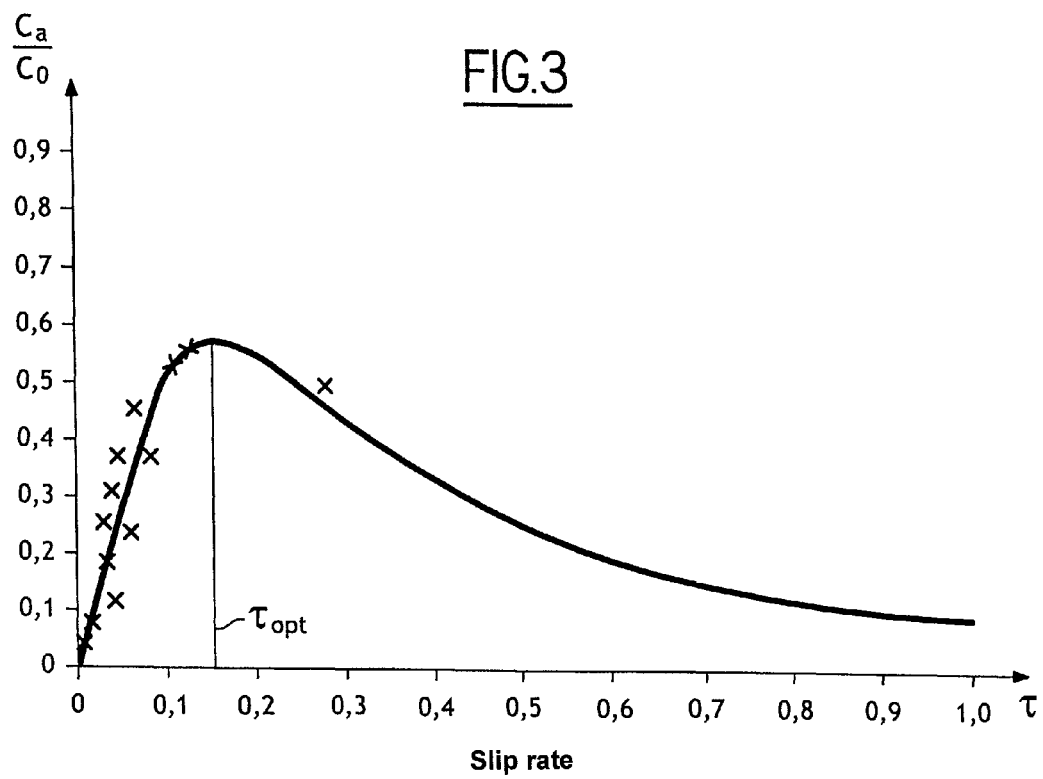
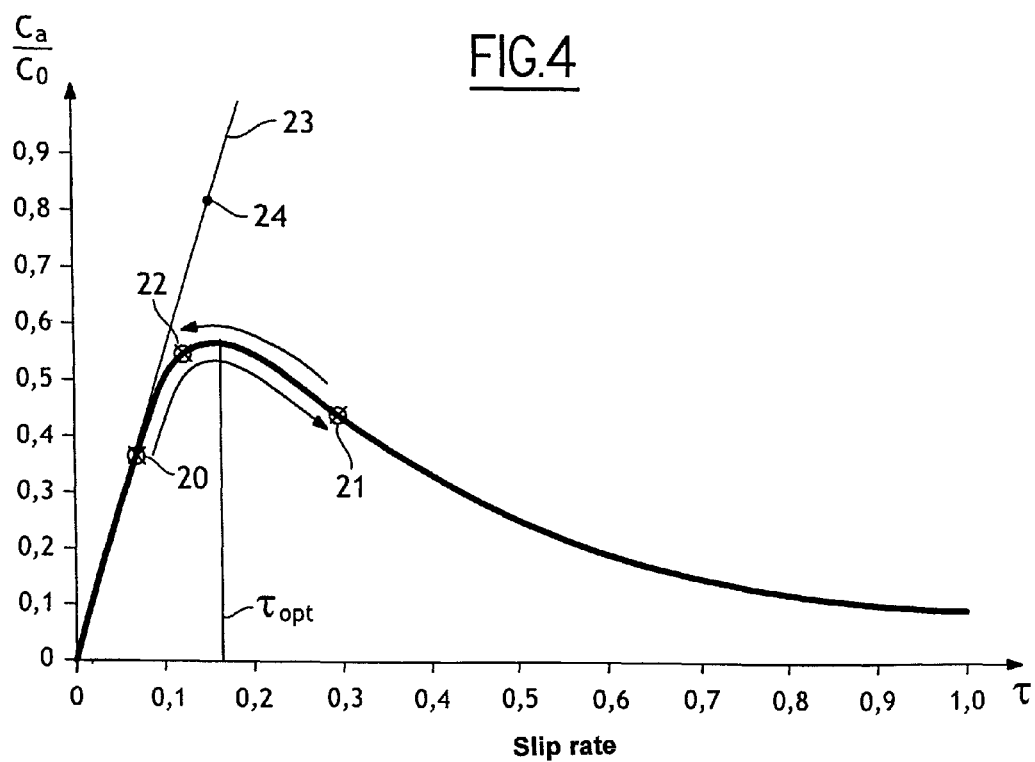

METHOD OF ADAPTIVE BRAKING CONTROL FOR A VEHICLE

The invention relates to a method of adaptively controlling braking for a vehicle.

BACKGROUND OF THE INVENTION

Methods of controlling braking for a vehicle having a plurality of wheels fitted with tires and brakes are known, with the control method generating a braking set-point for each wheel in response to a braking order. The control method includes anti-lock protection, e.g. comprising the following steps for each wheel:

estimating the slip rate of the wheel as being equal to $\tau=1-R\omega/v$ where R is the rolling radius of the wheel, $\omega$ the angular velocity of said wheel, and v the longitudinal speed of the aircraft; and if the slip rate is greater than an optimum slip rate, reducing the braking setpoint for the wheel so that the slip rate returns to being less than the optimum slip rate, the optimum slip rate being that for which the tire fitted on the wheel co-operates with the runway to develop a maximum coefficient of friction.

The braking setpoint may equally well be constituted by a hydraulic pressure applied to pistons when the brake is a hydraulic brake, on a force applied by the pushers of electromechanical actuators when the brake is an electric brake, or indeed a braking torque to be developed by brake in question.

That control method serves to limit wheel locking, thereby considerably improving braking performance and enabling the vehicle to be stopped over shorter distances.

In general, the optimum slip rate is predetermined, e.g. at a value of 8%. Nevertheless, it is known that the characteristics of friction between wheels and a runway are essentially variable and that the optimum slip rate can vary as a function of conditions encountered by the wheels on the ground (runway dry, wet, snow covered, icy, . . . ), such that the predetermined optimum slip rate cannot correspond to all of said conditions.

Estimation methods are known that serve to update certain characteristics of friction between the wheel and the runway. For example, document DE 10 2005 001 770 describes a method of regulating the slip rate in an anti-lock system, the method including the step of updating a parameterized grip model that is representative of a relationship between a coefficient of friction and a slip rate, and of deducing therefrom an updated optimum slip rate.

Similarly, document EP 1 372 049 describes how to determine an optimum slip rate, taking account of estimates or measurements, and how to regulate braking around that optimum slip rate.

Document US 2003/0154012 also discloses predictive anti-locking control which predicts a future slip rate on the basis of a non-parameterized grip model, in order to detect any tendency to locking and to modify accordingly the braking setpoint in order to avoid such locking.

OBJECT OF THE INVENTION

An object of the invention is to provide an improved braking control method.

BRIEF SUMMARY OF THE INVENTION

To achieve this object, the invention provides a braking control method for a vehicle having a plurality of wheels fitted with tires and with brakes, the control method including generating a braking setpoint for each wheel in response to a braking order, and comprising the following steps for each wheel:

regularly updating a grip model representative of a relationship between a coefficient of friction and a wheel slip rate;

using the regularly updated grip model and its characteristic shape to establish, in a given prediction horizon, the variation for the braking setpoint that, while complying with the braking order and predictable variation therein during the prediction horizon, also complies with a given calculation constraint; and retaining as the value for the braking setpoint a value of the variation as determined in this way that corresponds to a first calculation cycle in the prediction horizon.

Regularly updating the entire grip model makes it possible to work with dynamics that are representative of the actual state of the runway. In particular, there is no longer any need to make assumptions about runway state or rolling radius, since these are automatically taken into account by regularly updating the grip model.

Thus, the future behavior of the braking system is predicted, no longer on the basis of an unchanging grip model as in document US 2003/0154012, which can lead to wheel locking if the unchanging grip model does not correspond to the actual state of the runway (e.g. if the grip model is applicable to a dry runway, whereas the runway is wet or covered in snow), but on the basis of a grip model that is regularly updated, taking account of the actual state of the runway.

Preferably, the calculation constraint consists in ensuring that the wheel does not lock within the prediction horizon, and preferably in ensuring that the slip rate does not exceed an optimum slip rate for which grip is at a maximum.

BRIEF DESCRIPTION OF THE DRAWINGS

The invention can be better understood in the light of the following description with reference to the figures of the accompanying drawings, in which:

FIG. 3 is a graph of a grip model plotting grip torque as a function of slip rate and updated in accordance with the invention; and FIG. 4 is a graph analogous to the graph of FIG. 3, showing the operation of the predictive regulator included in the control method of a particular implementation of the invention.

DETAILED DESCRIPTION OF THE INVENTION

Figure 1:
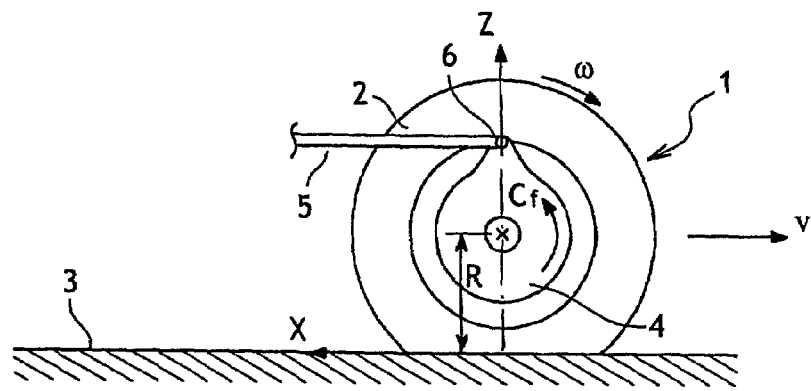
FIG. 1 is a diagrammatic side view of an aircraft wheel.

The invention is described below in application to an aircraft. With reference to FIG. 1, an aircraft wheel 1 is fitted with a tire 2 that is in contact with a runway 3. The wheel 1 is fitted with a brake 4 adapted to apply selectively a braking torque $C_f$ in response to a braking setpoint. The wheel carries a vertical load Z and is subjected to a friction force X at the interface between the tire and the ground, which friction force is related to the vertical load by the relationship $X=\mu.Z$ where $\mu$ is a coefficient of friction between the tire 2 and the runway 3, which coefficient itself depends on a slip rate equal to: $\tau=1-R\omega/v$ where R is the rolling radius of the wheel 1, $\omega$ is the angular velocity of the wheel, and v is the longitudinal speed of the aircraft. The friction force X may in equivalent manner be associated with a grip torque given by $C_a=R.X=R.\mu.Z$. It should be observed that the grip torque is representative of variations in the coefficient of friction with slip rate insofar as grip torque and coefficient of friction present a maximum at substantially the same optimum slip rate.

The dynamic behavior of the wheel 1 is given by the differential equation $I\dot{\omega}=C_a(\tau)-C_f$, where I is the inertia of the wheel 1.

The control method of the invention comprises firstly the step of regularly updating the grip model. Here it is a grip model associating variations in grip torque $C_a$ with slip rate that it has been decided to update. For this purpose, use is made of:
- the measured speed of rotation $\omega$ of the wheel as delivered by a tachometer;
- an estimated speed v of the aircraft, e.g. as provided by the inertial units of the aircraft. In a variant, the aircraft speed v could be reconstructed using measurements of the speeds of rotation of the wheels of the aircraft; and
- a measurement of the braking torque $C_f$ applied by the brake 4 to the wheel 1. Here the brake 4 is prevented from rotating by a take-up bar 5 with a connection to the brake 4 that can be fitted with instruments to deliver a measurement of the torque applied by the brake 4.

By measuring $\omega$ and v, it is possible to estimate the slip rate $\tau$. By measuring the braking torque $C_f$, the grip torque can be deduced using the dynamic equation $C_a(\tau)=I\dot{\omega}+C_f$. The grip torque $C_a$ is normalized by dividing by a reference torque $C_0$, thereby obtaining on each calculation cycle a point $(C_a/C_0, \tau)_k$ where k is the index for the calculation cycle.

Once a parameterized grip model has been selected, e.g. the well-known Pacejka grip model giving a characteristic relationship between the grip torque and the slip rate, the parameters of the grip model are updated by a regression method, e.g. by the least squares method. FIG. 3 is a graph illustrating this updating. The relationship $C_a/C_0=f_{q_1,\ldots,q_n}(\tau)$ represented by the bold curve is updated relative to twenty points $(C_a/C_0, \tau)_k$ established during the last twenty calculation cycles, with the parameters $q_1, \ldots, q_n$ being estimated by regression.

This regular updating serves to ensure that a realistic grip model is available that is representative of the current state of the runway. In practice, the grip model is updated sufficiently often to avoid any sudden change in the state of the runway (e.g. passing through a puddle) giving rise to the wheel becoming locked. Simulations have shown that updating once every 50 milliseconds (ms) to 100 ms with a calculation cycle size of 5 ms can be suitable, i.e. updating at least once for every twenty calculation cycles. If a large amount of calculation capacity is available, it is naturally advantageous to update the grip model on each calculation cycle.

The curve as obtained in this way enables the optimum slip rate $\tau_{opt}$ to be determined, as shown in FIG. 3. This is the slip rate for which the grip torque is at a maximum. The optimum slip rate $\tau_{opt}$ may be determined either by using the updated parameters $q_i, \ldots, q_n$ that are injected into an analytic formula giving the optimum slip rate $\tau_{opt}$, or else by iteratively searching for the slip rate at which the curve of the grip model presents a slope of zero. This means that a regularly updated optimum slip rate $\tau_{opt}$ is available taking account of the current state of the runway. However, because the entire curve is updated, the entire dynamic range of braking is also available, for slip rates lying in the range 0 to 1, with this dynamic range being given by the characteristic shape of the relationship at each operating point $(C_a/C_0, \tau)$.

According to the invention, the regularly updated grip model makes it possible to implement predictive control over braking, thus making it possible to reduce considerably any risk of the wheel locking.

Figure 2:
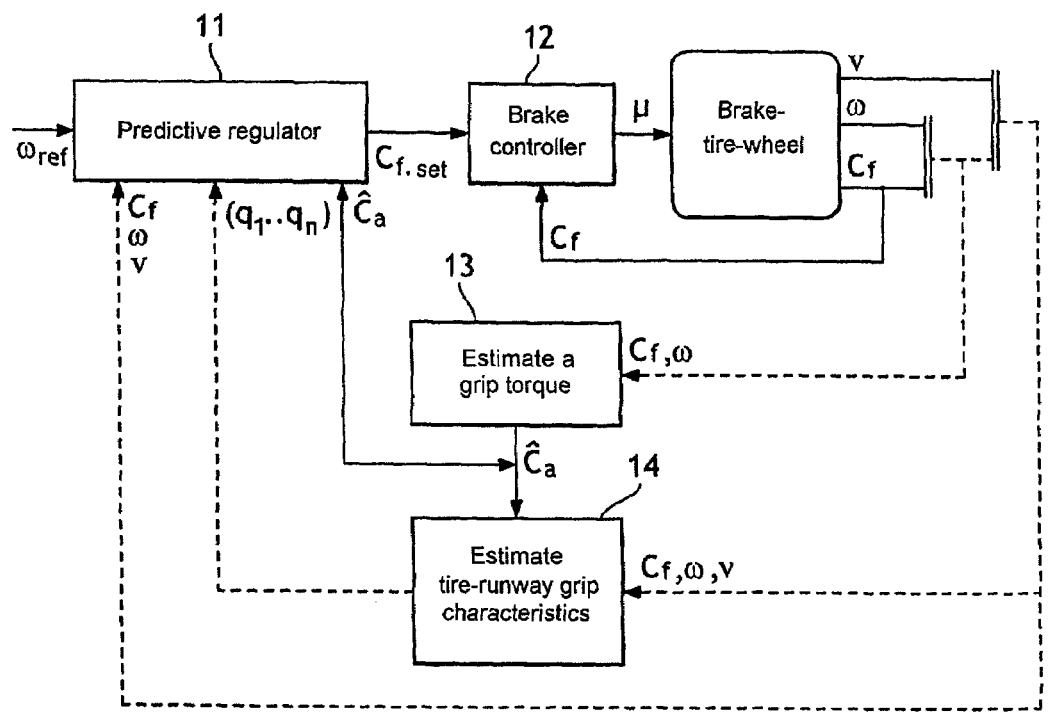
FIG. 2 is a block diagram of control in a particular implementation of the invention.

With reference to FIG. 2, the control method of the invention is implemented in a braking computer of the aircraft, that receives a braking order in the form of a setpoint, here a reference speed $\omega_{ref}$ that is delivered to a predictive regulator 11 described in greater detail below. The predictive regulator 11 generates a braking setpoint, here in the form of a setpoint for braking torque $C_{f,set}$. A controller 12 uses the braking torque setpoint $C_{f,set}$ and the measured braking torque $C_f$ to calculate a command U for applying to the brake actuator member. This member may be a servo-valve for delivering pressure to the brake, in which case the command U is a current fed to the servo-valve. The member could equally well be an electromechanical braking actuator, in which case the command U is a position or a force setpoint for an inverter serving to power the electric motor of the actuator.

In response to the command U, the brake applies a braking force on the wheel, which responds as a function of its own dynamic behavior, of the dynamic behavior of the aircraft, and the current state of the runway.

The control method also includes an estimator 13 for estimating grip torque that delivers an estimated grip torque $\hat{C}_a$ on the basis of the measured braking torque $C_f$ and the speed of rotation of the wheel $\omega$. The estimated grip torque $\hat{C}_a$ is delivered both to the predictive regulator 11 and to a updating module 14 for updating the grip model, which, as explained above, regularly updates parameters $q_1, \ldots, q_n$ of the grip model $C_a/C_0=f_{q_1,\ldots,q_n}(\tau)$. The update parameters $q_1, \ldots, q_n$ are delivered to the predictive regulator 11 so that it can make use of the dynamic behavior deduced from the updated grip model that takes account of the present conditions of the runway.

On each calculation cycle, i.e. once very 5 ms in this example, the predictive regulator 11 calculates a new setpoint value for the braking torque $C_{f,set}$, which value is determined as follows. Consideration is given to a receding prediction horizon, here taken to be equal to twenty calculation cycles as from the present calculation cycle. Using the updated grip model and taking its characteristic state into account, the predictive regulator 11 determines how the braking torque setpoint $C_{f,set}$ should vary so that, under present conditions of the runway as given by the most recent updating of the grip model, it complies with the braking order, or to calculate how the braking order is likely to vary over the same prediction horizon.

Amongst all possible variations, it is preferred here to retain variation in the braking torque setpoint for which, under a given calculation constraint, the slip rate does not exceed the optimum slip rate $\tau_{opt}$ as determined using the updated grip model. In practice, and in known manner, such variation is determined by an iterative process that minimizes a cost function J under the constraint $\tau \leq \tau_{opt}$.

In FIG. 4, shows in graphical form the result of the calculation cycles performed by the regulator, and it can be seen diagrammatically how, starting from an initial operating point 20 on the updated grip model, the predictive regulator 11 calculates a first variation in the braking torque setpoint $C_{f,set}$ that brings the operating point at the end of the prediction horizon to the point 21 on the curve representing the model for which the slip rate exceeds the optimum slip rate $\tau_{opt}$, and then by the above-mentioned iterative process, calculates variations in the braking torque setpoint $C_{f,set}$ that serve to bring the operating setpoint at the end of the prediction horizon to the point 21 at which the slip rate remains below the optimum slip rate $\tau_{opt}$.

Once such variation in the braking torque setpoint $C_{f,set}$ has been determined, the value corresponding to the first calculation cycle of the prediction horizon is retained and used as the setpoint value for the braking torque $C_{f,set}$.

In a variant, it can suffice to implement a simplified prediction during which it is assumed that the braking order remains constant over the prediction horizon. A search is then made for a value such that, at the end of the prediction horizon, it will give an operating point close to the optimum slip rate, but without exceeding it.

To make a good prediction, it is important firstly to have a grip model that is regularly updated (contrary to document US 2003/0154012 that teaches making prediction on a grip model that is not updated), and also to make use of the non-linear dynamic behavior of the grip model given by its characteristic shape. It should be observed that the grip model is highly non-linear, particularly in the vicinity of the optimum slip rate. It is therefore important to work with the real dynamic behavior of the grip model, as shown in FIG. 4. For a horizon of twenty calculation cycles, the operating point can move enormously, so as to go well away from the initial operating point. In FIG. 4, if only the tangent 23 to the curve at the initial operating point were to be retained, then an operating point 24 at the end of the prediction horizon would have been predicted that corresponds to an unrealistic grip torque, but without the corresponding slip rate exceeding the optimum slip rate. Making a prediction by linearizing the grip model around the initial operating point thus makes the prediction more random, particularly when the operating point is close to the optimum slip rate, and can thus lead to an overestimate of the capacity of the tire to grip the runway, which can lead to the wheel locking. (It should be observed that in document DE 10 2005 001 770, the dynamic behavior of the model, i.e. specifically the value of the slope c1, is not used for calculating a braking setpoint. It is only its sign that is used for determining the position of the optimum slip rate.)

It is thus preferable to work with the non-linear dynamic behavior of the grip model and thus to take account of its characteristic shape as updated, at least around the current operating point.

Having thus decided to use a grip model that is regularly update and a prediction that takes account of the dynamic behavior of the grip model over a wide range of slip rates, and not only in the immediate vicinity of the operating point, any risk of the wheel locking is considerably reduced.

In practice, the predictive regulator 11 and the grip model estimator 14 operate in parallel, and advantageously constitute two distinct modules, each capable of being modified without involving the other. Thus, with the same predictive regulator 11, it is possible to change the grip model estimator, or conversely, while keeping the same grip model, it is possible to change the predictive regulator, e.g. by modifying its prediction horizon or the cost criterion J.

The invention is not limited to the above description, but on the contrary covers any variant coming within the ambit defined by the claims.

In particular, although it is stated herein that prediction is performed with a horizon at twenty calculation cycles, it is possible to use horizons that are further away or closer. In particular, it is possible to use a horizon that is limited to one calculation cycle, thus implementing so-called optimum control.

It is also possible to make use of a calculation constraint other than not exceeding the optimum slip rate. It is possible to accept such overshoots, providing they do not lead too often to the wheel locking. For example, as the constraint, it is possible to use a predetermined slip rate, or a function of the optimum slip rate, e.g. 1.1 times the optimum slip rate. Conversely, it is possible to use a slip rate that is a function of the optimum slip rate and equal to 0.9 times the optimum slip rate in order to improve the sideways grip of the tires at low speed.

It should be observed that it is equivalent to work not with slip rate, but with the speed of rotation of the wheel. This is deduced from slip rate by the formula:

$$\omega = \frac{v}{R}(1 - \tau).$$

Thus, instead of working on a grip model that is a function of slip rate, it is possible to work on a grip model that is a function of the speed of rotation of the wheel.

What is claimed is:

1. A braking control method, implemented by a braking computer, for a vehicle having a plurality of wheels fitted with tires and with brakes, the control method including generating for each wheel a braking setpoint in response to a braking order, said generation comprising:
    regularly updating a grip model representative of a relationship between a coefficient of friction and a wheel slip rate;
    determining, with said braking computer, with an iterative calculation process comprising a plurality of calculation cycles a variation of the braking setpoint in a given prediction horizon, said variation of the braking setpoint in the given prediction horizon being established using the regularly updated grip model and its characteristic shape and so that said variation of the braking setpoint in the given prediction horizon complies with the braking order and complies with a given calculation constraint which is function of said wheel slip rate; and
    retaining as the generated braking setpoint a value of the braking setpoint in said given prediction horizon which corresponds to a first calculation cycle of the plurality of calculation cycles of said iterative calculation process.

2. A control method according to claim 1, in which the updating of the grip model is performed at least once every generation of the braking setpoint.

3. A control method according to claim 2, in which updating of the grip model is performed at every generation of the braking setpoint.

4. A control method according to claim 1, in which the calculation constraint consists in requiring the slip rate to remain less than a slip rate determined from an optimum slip rate derived from the regularly update grip model, within the prediction horizon.

5. A control method according to claim 4, in which the determined slip rate is equal to the optimum slip rate.

6. A control method according to claim 1, in which the updating of the grip model and the generation of the braking setpoint are performed in parallel in two distinct modules.

* * * * *